US011804610B2

(12) United States Patent
Tsujiguchi et al.

(10) Patent No.: US 11,804,610 B2
(45) Date of Patent: Oct. 31, 2023

(54) FUEL CELL SYSTEM

(71) Applicants: JTEKT CORPORATION, Kariya (JP); NATIONAL UNIVERSITY CORPORATION KANAZAWA UNIVERSITY, Kanazawa (JP)

(72) Inventors: Takuya Tsujiguchi, Kanazawa (JP); Yasuhide Takeda, Nisshin (JP); Atsushi Kubo, Matsubara (JP); Akihiro Takazato, Kashiwara (JP); Toshiyuki Saito, Kashiba (JP); Motoo Nakai, Nara (JP); Yusuke Ueda, Tondabayashi (JP)

(73) Assignees: JTEKT CORPORATION, Kariya (JP); NATIONAL UNIVERSITY CORPORATION KANAZAWA UNIVERSITY, Kanazawa (JP)

( * ) Notice: Subject to any disclaimer, the term of this patent is extended or adjusted under 35 U.S.C. 154(b) by 0 days.

(21) Appl. No.: 17/772,965

(22) PCT Filed: Oct. 23, 2020

(86) PCT No.: PCT/JP2020/039887
§ 371 (c)(1),
(2) Date: Apr. 28, 2022

(87) PCT Pub. No.: WO2021/085326
PCT Pub. Date: May 6, 2021

(65) Prior Publication Data
US 2022/0393200 A1    Dec. 8, 2022

(30) Foreign Application Priority Data

Oct. 31, 2019   (JP) ................................ 2019-198715

(51) Int. Cl.
H01M 8/04       (2016.01)
H01M 8/04186    (2016.01)
(Continued)

(52) U.S. Cl.
CPC ... H01M 8/04186 (2013.01); H01M 8/04746 (2013.01); H01M 8/0668 (2013.01); H01M 8/1011 (2013.01)

(58) Field of Classification Search
CPC ......... H01M 8/04186; H01M 8/04746; H01M 8/0668; H01M 8/1011
See application file for complete search history.

(56) References Cited

U.S. PATENT DOCUMENTS

2006/0107690 A1   5/2006  Davey et al.
2012/0264029 A1*  10/2012 Takamori ............ H01M 8/0662
                                                429/455
2013/0130141 A1   5/2013  Matsuda et al.

FOREIGN PATENT DOCUMENTS

JP    2005-535861 A    11/2005
JP    2009-217975 A     9/2009
(Continued)

OTHER PUBLICATIONS

International Search Report dated Jan. 19, 2021 in PCT/JP2020/039887, filed on Oct. 23, 2020, 7 pages (with translation).
(Continued)

*Primary Examiner* — Olatunji A Godo
(74) *Attorney, Agent, or Firm* — Oblon, McClelland, Maier & Neustadt, L.L.P.

(57) ABSTRACT

A fuel cell system having a direct liquid fuel cell that uses a liquid containing a formic acid or an alcohol as a fuel includes: a fuel tank that stores the fuel to be supplied to the fuel cell; a fuel supply device that supplies the fuel in the (Continued)

fuel tank to the fuel cell; and a bubbling device that blows an inert gas into the fuel stored in the fuel tank.

3 Claims, 4 Drawing Sheets

(51) Int. Cl.
  *H01M 8/04746* (2016.01)
  *H01M 8/0668* (2016.01)
  *H01M 8/1011* (2016.01)

(56) References Cited

FOREIGN PATENT DOCUMENTS

| | | |
|---|---|---|
| JP | 2014-11001 A | 1/2014 |
| JP | 2014-118001 A | 6/2014 |
| JP | 2015-64934 A | 4/2015 |
| WO | WO 2006/093098 A1 | 9/2006 |
| WO | WO 2013/011609 A1 | 1/2013 |

OTHER PUBLICATIONS

Written Opinion dated Jan. 19, 2021 in PCT/JP2020/039887, filed on Oct. 23, 2020, 4 pages (no translation).

* cited by examiner

FUEL CELL SYSTEM

TECHNICAL FIELD

The present disclosure relates to a fuel cell system.

BACKGROUND ART

Various techniques relating to a direct liquid fuel cell in which a liquid fuel is directly supplied to a fuel electrode without being reformed have been proposed. For example, JP2009-217975A discloses a direct methanol fuel cell using methanol as fuel and a direct formic acid fuel cell using formic acid as fuel. A direct liquid fuel cell includes a fuel electrode that oxidizes a fuel, an air electrode that reduces an oxidant gas such as air, and an electrolyte membrane that performs ion conduction between the air electrode and the fuel electrode. Here, the fuel electrode is an anode, and the air electrode is a cathode.

The fuel electrode is provided with a fuel inflow port through which the fuel flows, and a fuel outflow port through which the fuel used for power generation in the fuel electrode flows out. In the fuel electrode, a fuel flow path through which the fuel flows from the fuel inflow port to the fuel outflow port is formed in order to diffuse the fuel into the fuel electrode. As the fuel flows through the fuel flow path, the fuel is diffused in the fuel electrode and is further oxidized. When the fuel is oxidized, carbon dioxide is generated and heat is generated.

In the direct liquid fuel cell, as the fuel is oxidized in the fuel electrode, a carbon dioxide gas generated due to the following factors (1) and (2) is generated and becomes bubbles.

The carbon dioxide gas of the factor (1) comes from carbon dioxide generated by the fuel being oxidized.

With respect to the carbon dioxide gas of the factor (2), the solubility of carbon dioxide with respect to the fuel decreases due to an increase in the temperature of the fuel due to the heat generation, so that the carbon dioxide dissolved in the fuel is not kept in the fuel in a dissolved condition and is generated from the fuel.

The bubbles of the carbon dioxide gas generated in the fuel electrode may stagnate in the fuel electrode. When the bubbles of the carbon dioxide gas stagnate in the fuel electrode, the diffusion of the fuel in the fuel electrode is hindered, and it is difficult for the oxidation reaction of the fuel to proceed. As a result, the power generation efficiency is reduced. In addition, when the bubbles of the carbon dioxide gas stagnate in the fuel flow path, the flow of the fuel in the fuel flow path is hindered, and thus the power generation efficiency is reduced.

For this reason, it is desired to reduce a generation amount of the carbon dioxide gas generated in the fuel electrode in order to further improve the power generation efficiency of the direct liquid fuel cell. Since the carbon dioxide gas of the factor (1) is a carbon dioxide gas generated by the fuel being oxidized, a generation amount thereof cannot be reduced. On the other hand, if a generation amount of the carbon dioxide gas of the above factor (2) can be reduced, the power generation efficiency can be further improved. However, JP2009-217975A does not disclose reducing the generation amount of the carbon dioxide gas of the above factor (2).

SUMMARY OF INVENTION

The present disclosure provides a fuel cell system capable of further reducing a concentration of carbon dioxide in a fuel and further improving power generation efficiency.

According to a first aspect of the present disclosure, a fuel cell system having a direct liquid fuel cell configured to use a liquid containing a formic acid or an alcohol as a fuel includes: a fuel tank configured to store the fuel to be supplied to the fuel cell; a fuel supply device configured to supply the fuel in the fuel tank to the fuel cell; and a bubbling device configured to blow an inert gas into the fuel stored in the fuel tank.

According to a second aspect of the present disclosure, the fuel cell system further includes a carbon dioxide removing device configured to remove a carbon dioxide among the inert gas and the carbon dioxide, the carbon dioxide being dissolved in the fuel and released from the fuel in the fuel tank.

According to a third aspect of the present disclosure, the bubbling device includes a flow rate adjustment valve configured to adjust a flow rate of the inert gas blown into the fuel stored in the fuel tank, and the fuel cell system further includes a control device configured to perform a control of the fuel supply device and a control of the flow rate adjustment valve. The control device is configured to: perform a control of blowing the inert gas at a first flow rate into the fuel stored in the fuel tank with the flow rate adjustment valve before starting supplying the fuel to the fuel cell with the fuel supply device; and perform a control of blowing the inert gas at a second flow rate smaller than the first flow rate into the fuel stored in the fuel tank with the flow rate adjustment valve after starting supplying the fuel to the fuel cell with the fuel supply device.

According to a fourth aspect of the present disclosure, the fuel stored in the fuel tank includes the fuel in which a concentration of the carbon dioxide is reduced by a heat treatment.

According to the first aspect, in the fuel cell system, the bubbling device blows the inert gas into the fuel stored in the fuel tank, so that the concentration of carbon dioxide in the fuel stored in the fuel tank can be reduced. Accordingly, the fuel supply device can supply the fuel in which concentration of the carbon dioxide is reduced in the fuel tank to the fuel cell. In a fuel electrode of the fuel cell, the fuel is warmed by heat generation by oxidation of formic acid (fuel). In addition, as the temperature of the fuel increases, the solubility of carbon dioxide in the fuel decreases. In the fuel cell system, the bubbling device is used to supply the fuel having a reduced concentration of carbon dioxide to the fuel cell, so that even when the solubility of carbon dioxide with respect to the fuel is decreased in the fuel electrode, it is possible to suppress an occurrence therein that the carbon dioxide dissolved in the fuel is not dissolved at all in the fuel and becomes bubbles.

Accordingly, it is possible to suppress an occurrence that the bubbles of a carbon dioxide gas stagnate in the fuel electrode, the diffusion of the fuel in the fuel electrode is hindered, and the oxidation reaction of the fuel is made difficult to proceed, causing a decrease in the power generation efficiency. Further, it is possible to suppress an occurrence that the bubbles of the carbon dioxide gas stagnate in a fuel flow path and the flow of the fuel in the fuel flow path is hindered, causing a decrease in the power generation efficiency. Therefore, the fuel cell system can further reduce the concentration of the carbon dioxide in the fuel to further improve the power generation efficiency.

According to the second aspect, in the fuel cell system, carbon dioxide, which is dissolved in the fuel but released from the fuel together with the inert gas in the fuel tank, is removed by the carbon dioxide removing device, so that it is possible to prevent carbon dioxide, which is a kind of greenhouse gas, from being discharged to the outside of the fuel cell system.

According to the third aspect, in the fuel cell system, with respect to the flow rate of the inert gas blown into the fuel stored in the fuel tank, the second flow rate after start of supply of the fuel to the fuel cell is smaller than the first flow rate before the start of supply of the fuel to the fuel cell. Accordingly, a use amount of the inert gas blown into the fuel can be reduced after the supply of the fuel to the fuel cell is started, that is, the fuel cell starts power generation, and the concentration of the carbon dioxide in the fuel can be further reduced.

According to the fourth aspect, in the fuel cell system, the fuel stored in the fuel tank is a fuel in which concentration of the carbon dioxide is reduced by the heat treatment. Accordingly, the fuel cell system can reduce the amount of inert gas blown into the fuel stored in the fuel tank by the bubbling device, which is necessary to reduce the concentration of the carbon dioxide dissolved in the fuel.

DESCRIPTION OF EMBODIMENTS

Hereinafter, a fuel cell system 1 according to an embodiment of the present disclosure will be described with reference to the drawings. A fuel cell 7 of the fuel cell system 1 to be described in the present embodiment is a direct liquid fuel cell using an aqueous solution of formic acid or alcohol such as methanol as fuel, and a direct formic acid fuel cell using formic acid as fuel will be described as an example thereof in the following description. Here, the direct liquid fuel cell refers to a fuel cell in which a liquid fuel is directly supplied to a fuel electrode without being reformed. Further, the direct formic acid fuel cell is a fuel cell in which an aqueous solution of formic acid is used as fuel and is directly supplied to a fuel electrode 10 (see FIG. 3) without reforming the formic acid. Note that, when an X axis, a Y axis, and a Z axis are shown in the drawings, the axes are orthogonal to one another, a Z axis direction is a vertical upward direction, a Y axis direction is a stacking direction of the fuel cell 7, and an X axis direction is a horizontal width direction of the fuel cell 7.

[Overall Configuration of Fuel Cell System 1 (FIGS. 1 and 2)]

Figure 1:
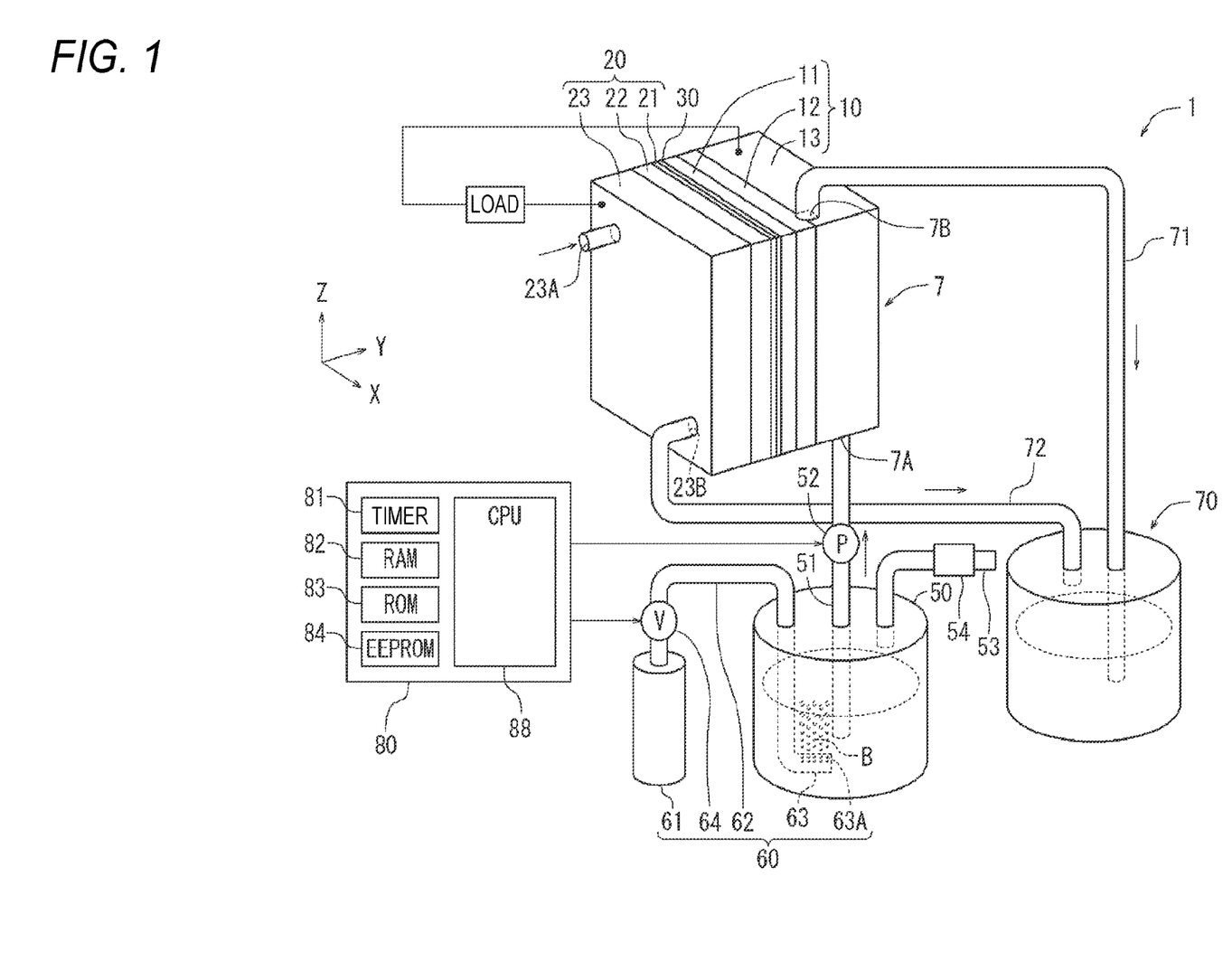
FIG. 1 is a diagram illustrating an overall configuration of a fuel cell system according to an embodiment.
Figure 2:
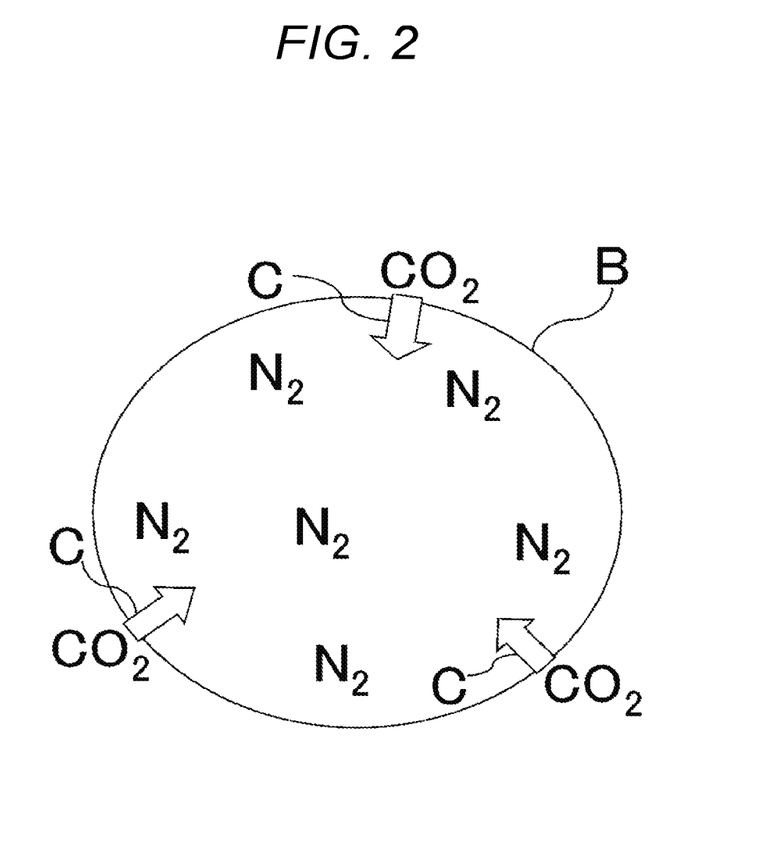
FIG. 2 is a diagram illustrating that carbon dioxide is removed from a fuel by an inert gas blown into the fuel.

FIG. 1 is a diagram illustrating an overall configuration of the fuel cell system 1 including the fuel cell 7. FIG. 2 is a diagram illustrating that carbon dioxide is removed from the fuel by an inert gas blown into the fuel. As illustrated in FIG. 1, the fuel cell system 1 includes the fuel cell 7, a fuel tank 50, a fuel supply pump 52 (equivalent to a fuel supply device), a bubbling device 60, a waste-liquid tank 70, a fuel discharge pipe 71, a recovery pipe 72, a control device 80, and the like. Although the details will be described below, in the fuel cell system 1 of the present embodiment, the bubbling device 60 can reduce a concentration of carbon dioxide in the fuel by blowing an inert gas into the fuel stored in the fuel tank 50.

The fuel tank 50 stores, as the fuel to be supplied to the fuel cell 7, an aqueous solution of formic acid containing a predetermined concentration of formic acid. Further, one end of a fuel supply pipe 51 is connected to the fuel tank 50, and the other end of the fuel supply pipe 51 is connected to a fuel inflow port 7A of the fuel cell 7. The concentration of formic acid in the aqueous solution of formic acid (fuel) is, for example, about 10[%] to 40[%].

Here, the fuel stored in the fuel tank 50 is a fuel that is subjected to heat treatment in advance. The heat treatment is treatment in which the fuel is heated to a predetermined temperature and then the fuel is placed in an environment filled with an inert gas. The predetermined temperature is a temperature higher than room temperature (20° C.) and lower than a boiling point of the fuel. As the temperature of the fuel increases, the solubility of carbon dioxide in the fuel decreases. Therefore, in the heat treatment, first, the fuel is heated to lower the solubility of carbon dioxide with respect to the fuel, so that the carbon dioxide dissolved in the fuel is not dissolved at all, and is removed from the fuel. In the heat treatment, next, the fuel is placed in an environment filled with an inert gas (described later), so that carbon dioxide does not exist around the fuel and carbon dioxide is prevented from being dissolved in the fuel. As will be described later, an inert gas is injected into the fuel tank 50 by using the bubbling device 60, so that the fuel in the fuel tank 50 can be kept in an environment filled with the inert gas.

The fuel supply pump 52 is an electric pump, is provided in the fuel supply pipe 51, and is connected to the control device 80. The fuel supply pump 52 pumps the fuel in the fuel tank 50 toward the fuel inflow port 7A of the fuel cell 7 based on a control signal output from the control device 80.

A gas exhaust pipe 53 extends from an inside to an outside of the fuel tank 50, and is provided with a carbon dioxide removing device 54. One end of the gas exhaust pipe 53 is provided in an upper space in the fuel tank 50 where a gas is accumulated, and the other end of the gas exhaust pipe 53 communicates with a space outside the fuel cell 7.

The carbon dioxide removing device 54 is provided in the gas exhaust pipe 53, and includes a hollow container communicating with the gas exhaust pipe 53. A carbon dioxide removing material for removing carbon dioxide in a gas flowing through the gas exhaust pipe 53 is disposed inside the carbon dioxide removing device 54. As will be described later, the carbon dioxide removing device 54 removes a carbon dioxide dissolved in the fuel, which is released from the fuel together with the inert gas and flows through the gas exhaust pipe 53. Any known material capable of removing carbon dioxide such as an aqueous solution of amine, bicarbonate or the like and a salt of calcium oxide or the like can be used as the carbon dioxide removing material, and one or a combination of a plurality of kinds thereof can be used.

Preferred examples of the carbon dioxide removing material include an amine-based absorbent that contains an amine and causes the amine to react with carbon dioxide reversibly. In particular, an amine-based absorbent in which an amine is supported on a particulate resin or a porous support is preferable. By supporting an amine on a particulate support, the amine can be prevented from flowing out of the carbon dioxide removing device 54. In addition, since the carbon dioxide removing material can be easily exchanged, maintenance of the carbon dioxide removing device 54 can be efficiently performed. Note that a term "amine absorbent" in the present specification refers to a carbon dioxide removing material containing an amine.

Particularly preferable amines include monoethanolamine, methyldiethanolamine, 2-amino-2-methyl-1-propanol, and piperazine. A main absorption reaction of carbon dioxide in the amine-based absorbent is expressed by the following Formula (1) or Formula (2).

$$2\text{R-NH}_2 + \text{CO}_2 \rightarrow \text{R-NH}_3^+ + \text{R-NH—COO}^- \qquad \text{Formula (1)}$$

$$\text{R-NH}_2 + \text{CO}_2 + \text{H}_2\text{O} \rightarrow \text{R-NH}_3^+ + \text{R-NH—CO}_3^- \qquad \text{Formula (2)}$$

The bubbling device 60 includes an inert gas tank 61, an inert gas supply pipe 62, a nozzle part 63, and a flow rate adjustment valve 64, and blows an inert gas into the fuel stored in the fuel tank 50.

The inert gas tank 61 stores a high-pressure inert gas. The inert gas may be any gas that does not chemically react in the fuel cell, and for example, a nitrogen gas or an argon gas is used. In the present embodiment, a nitrogen gas is used as the inert gas. One end of the inert gas supply pipe 62 is connected to the inert gas tank 61. The other end of the inert gas supply pipe 62 is connected to the nozzle part 63 disposed at a bottom portion in the fuel tank 50. The nozzle part 63 is provided with a large number of blowout holes 63A. The inert gas flowing from the inert gas tank 61 to the inert gas supply pipe 62 is blown from the blowout holes 63A of the nozzle part 63 into the fuel stored in the fuel tank 50.

Here, as illustrated in FIG. 1, the inert gas is blown, in the form of a fine bubble B, into the fuel stored in the fuel tank 50 from the large number of blowout holes 63A of the nozzle part 63. The inert gas and the carbon dioxide gas easily mix with each other. Therefore, as indicated by an arrow C in FIG. 2, carbon dioxide ($CO_2$) molecules in contact with the bubble B of the inert gas are easily introduced into the bubble B of the inert gas from the formic acid solution side, and thus are taken into the bubble B of the inert gas. Further, the carbon dioxide ($CO_2$) molecules taken into the bubble B float up the fuel in the fuel tank 50 together with the bubble B of the inert gas, and are further discharged from the inside of the fuel to the outside. As described above, when the inert gas is blown into the fuel, the carbon dioxide ($CO_2$) dissolved in the fuel is released from inside the fuel into a gas accumulated in the fuel tank 50.

As illustrated in FIG. 1, the flow rate adjustment valve 64 is provided in the inert gas supply pipe 62 and is connected to the control device 80. The flow rate adjustment valve 64 can adjust a flow rate of the inert gas flowing out from the inert gas tank 61 to the inert gas supply pipe 62. Accordingly, the flow rate adjustment valve 64 adjusts the flow rate of the inert gas blown into the fuel stored in the fuel tank, based on a control signal output from the control device 80.

The waste-liquid tank 70 is connected to the other end of the fuel discharge pipe 71, and is connected to a fuel outflow port 7B of the fuel cell 7 via the fuel discharge pipe 71. The fuel (described later) used in the fuel cell 7 flows from the fuel outflow port 7B to the fuel discharge pipe 71, and flows into the waste-liquid tank 70 from the fuel discharge pipe 71. One end of the recovery pipe 72 is connected to the waste-liquid tank 70, and the other end of the recovery pipe 72 is connected to a discharge hole 23B (described later) of an air electrode 20. Air (oxygen) flowing in the air electrode 20 and water generated in the air electrode 20 are discharged to the recovery pipe 72 through the discharge hole 23B. Accordingly, the fuel flowing in from the fuel discharge pipe 71 after being used in the fuel cell 7 and the water (described later) flowing in from the recovery pipe 72 after being generated in the air electrode 20 are stored in the waste-liquid tank 70. In addition, the air (oxygen) flowing in the air electrode 20 flows from the recovery pipe 72 into the waste-liquid tank 70. An exhaust port (not shown) that communicates an inside and an outside is provided in an upper portion of the waste-liquid tank 70. When an internal pressure of the waste-liquid tank 70 increases, the gas in the waste-liquid tank 70 flows out of the waste-liquid tank 70 from the exhaust port (not shown).

The control device 80 includes an electronic circuit in which a timer 81 capable of measuring time, a CPU 88, and the like are mounted. The control device 80 is a well-known control device including the CPU 88, a RAM 82, a ROM 83, the timer 81, an EEPROM 84, and the like. The CPU 88 executes various types of operation processing based on various programs and the like stored in the ROM 83. The RAM 82 temporarily stores an operation result from the CPU 88, data input from various detection devices, and the like. The EEPROM 84 stores, for example, data to be stored at the time when the operation of the fuel cell 7 is stopped. As described above, the control device 80 is connected to the fuel supply pump 52 and the flow rate adjustment valve 64, and controls the fuel supply pump 52 and the flow rate adjustment valve 64. In addition, the control device 80 stores various types of information in order to control the fuel supply pump 52 and the flow rate adjustment valve 64. Therefore, the control device 80 can perform control related to power generation of the fuel cell 7. A structure of the fuel cell 7 will be described in detail below.

[Structure of Fuel Cell 7 (FIG. 3)]

Figure 3:
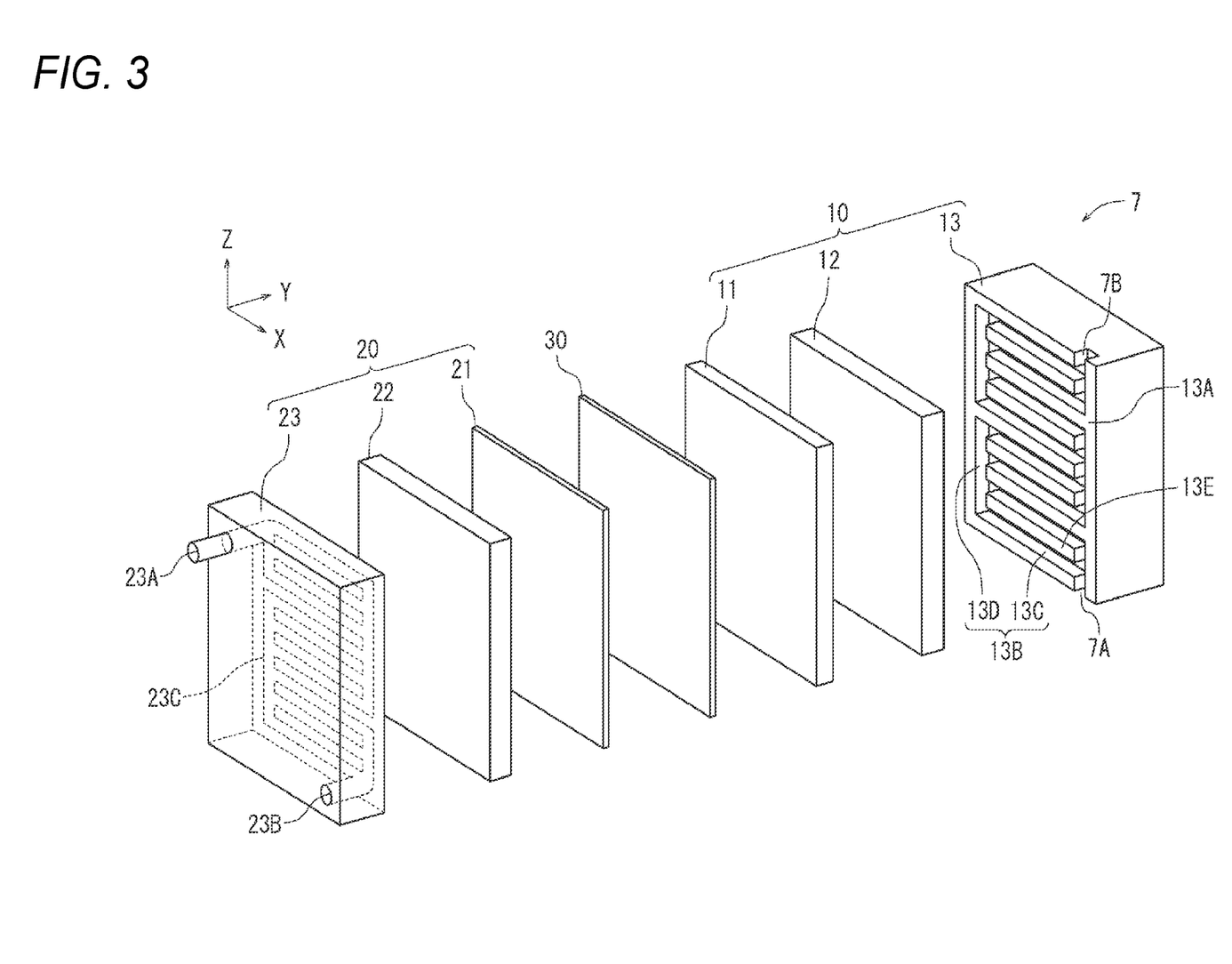
FIG. 3 is an exploded perspective view illustrating a configuration of a fuel cell according to the embodiment.

FIG. 3 is an exploded perspective view illustrating a configuration of the fuel cell 7. As illustrated in FIG. 3, the fuel cell 7 has a configuration in which an electrolyte membrane 30 is sandwiched between the air electrode 20 and the fuel electrode 10. The air electrode 20 is formed by stacking an air electrode catalyst layer 21, an air electrode diffusion layer 22, and an air electrode current collector 23. The fuel electrode 10 is formed by stacking a fuel electrode catalyst layer 11, a fuel electrode diffusion layer 12, and a fuel electrode current collector 13.

The air electrode current collector 23 is, for example, a plate-shaped metal having a thickness of about 1 [mm] to 10 [mm]. As illustrated in FIG. 1, one end of an electric load (for example, an electric motor) is connected to the air electrode current collector 23. In order to diffuse air (oxygen) into the air electrode diffusion layer 22 and to discharge water generated in the air electrode 20, the air electrode current collector 23 is provided with a supply port 23A for supplying pumped air from the outside, an air flow groove 23C connected to the supply port 23A, and a discharge hole 23B connected to the air flow groove 23C. Here, air is pumped to the supply port 23A by an air pump (not shown) connected to the control device 80.

In the air electrode current collector 23, the supply port 23A is provided on an upper side, and the discharge hole 23B is provided on a lower side. The air flow groove 23C is formed as a flow path having a narrow width on a surface of the air electrode current collector 23 on a side in contact with the air electrode diffusion layer 22. The water (described later) generated in the air electrode 20 flows into the air flow groove 23C. When the pumped air (oxygen) flows from the supply port 23A into the air flow groove 23C and flows through the air flow groove 23C, the pumped air is discharged from the discharge hole 23B to the recovery pipe 72 (see FIG. 1) together with the water generated in the air electrode 20. Note that the air flow groove 23C may be formed in the same shape as a fuel flow groove 13B.

The air electrode diffusion layer 22 is formed in a layer shape having a thickness of about 0.05 [mm] to 0.5 [mm]. The air electrode diffusion layer 22 is a porous material having electron conductivity that allows water and air to pass through. For example, carbon paper or carbon cloth may be used as the air electrode diffusion layer 22. The air electrode diffusion layer 22 guides air (oxygen) flowing from the supply port 23A of the air electrode current collector 23 to the air electrode catalyst layer 21 while diffusing the air. Oxygen contained in the outside air penetrates the air electrode diffusion layer 22 and reaches electrode catalyst particles of the air electrode catalyst layer 21.

The air electrode catalyst layer 21 is formed in a layer shape having a thickness of about 0.05 [mm] to 0.5 [mm]. The air electrode catalyst layer 21 includes electrode catalyst particles (not shown) of the air electrode and a particulate electrode catalyst support (not shown) supporting the electrode catalyst particles. The electrode catalyst particles of the air electrode 20 are particles of a catalyst for promoting a reaction rate of a reaction which reduces oxygen in the atmosphere. For example, platinum (Pt) particles may be used as the electrode catalyst particles. It is preferable that the electrode catalyst support is a particle that can support the electrode catalyst particles and has conductivity. For example, carbon powder may be used as the electrode catalyst support. When formic acid is used as the fuel, the redox reaction represented by the following Formula (3) proceeds by the electrode catalyst particles of the air electrode catalyst layer 21. The generated water (H$_2$O) flows from the air electrode catalyst layer 21 into the air flow groove 23C, is discharged from the discharge hole 23B of the air electrode current collector 23 to the recovery pipe 72 (see FIG. 1), and is guided to the waste-liquid tank 70 via the recovery pipe 72.

Formula (3)

$$2H^+ + \tfrac{1}{2}O_2 + 2e^- \rightarrow H_2O$$

The fuel electrode current collector 13 is, for example, a plate-shaped metal having a thickness of about 1 [mm] to 10 [mm]. The fuel electrode current collector 13 has a fuel flow surface 13A in contact with the fuel electrode diffusion layer 12, and a fuel flow groove 13B (fuel flow path) opened on the fuel electrode diffusion layer 12 side is formed in the fuel flow surface 13A. The fuel flow groove 13B is set as a flow path having a narrow width so that the fuel flows without stagnation. In addition, in order to recover electrons e$^-$, a land portion 13E that comes into contact with the fuel electrode diffusion layer 12 is formed in a periphery of the fuel flow groove 13B. As illustrated in FIG. 1, the other end of the electric load (for example, the electric motor) is connected to the fuel electrode current collector 13.

The fuel flow groove 13B has a plurality of flow groove portions 13C extending substantially in a horizontal direction from one edge portion (or the other edge portion) of the fuel electrode current collector 13 to the other edge portion (or one edge portion) opposite thereto. Each of the plurality of flow groove portions 13C is connected by a return groove portion 13D that is formed in the vicinity of one edge portion or the other edge portion of the fuel electrode current collector 13 and that extends in a substantially vertical direction. The fuel flow groove 13B is connected to the fuel inflow port 7A formed on a lower side of the fuel electrode current collector 13 and to the fuel outflow port 7B formed on an upper side of the fuel electrode current collector 13.

Accordingly, the fuel flowing into the fuel inflow port 7A is guided from the one edge portion side to the other edge portion side by the flow groove portion 13C, is changed in direction by the return groove portion 13D, is guided from the other edge portion side to the one edge portion side by the next flow groove portion 13C, and is changed in direction by the next return groove portion 13D, repeatedly. At the same time, the fuel flows through the fuel flow groove 13B formed as a serpentine type flow path, and is diffused into the fuel electrode diffusion layer 12.

The fuel electrode diffusion layer 12 is formed in a layer shape having a thickness of about 0.05 [mm] to 0.5 [mm]. The fuel electrode diffusion layer 12 is a porous material having electron conductivity that allows the fuel to penetrate into the inside thereof. For example, carbon paper or carbon cloth may be used as the fuel electrode diffusion layer 12. The fuel electrode diffusion layer 12 guides the fuel flowing in the fuel flow groove 13B formed on the fuel flow surface 13A of the fuel electrode current collector 13 to the fuel electrode catalyst layer 11 while diffusing the fuel.

The fuel electrode catalyst layer 11 is formed in a layer shape having a thickness of about 0.05 [mm] to 0.5 [mm]. The fuel electrode catalyst layer 11 includes electrode catalyst particles (not shown) and a particulate electrode catalyst support (not shown) supporting the electrode catalyst particles. The electrode catalyst particles of the fuel electrode 10 are particles of a catalyst for promoting an oxidation reaction rate of formic acid, which is the fuel. For example, palladium (Pd) particles may be used as the electrode catalyst particles. It is preferable that the electrode catalyst support is a particle that can support the electrode catalyst particles and has conductivity. For example, carbon powder may be used as the electrode catalyst support. When formic acid is used as the fuel, the oxidation reaction represented by the following Formula (4) proceeds by the electrode catalyst particles of the fuel electrode catalyst layer 11.

Formula (4)

$$HCOOH \rightarrow CO_2 + 2H^+ + 2e^-$$

The electrolyte membrane 30 is formed in a thin film shape having a thickness of about 0.01 [mm] to 0.3 [mm]. The electrolyte membrane 30 is sandwiched between the fuel electrode catalyst layer 11 of the fuel electrode 10 and the air electrode catalyst layer 21 of the air electrode 20, and is a proton exchange membrane having no electron conductivity that allows water and protons (H$^+$) to pass through. As the electrolyte membrane 30, for example, a perfluoroethylene sulfonic acid-based membrane such as Nafion (registered trademark) manufactured by DuPont may be used. A member obtained by joining and integrating the fuel electrode catalyst layer 11, the fuel electrode diffusion layer 12, the electrolyte membrane 30, the air electrode catalyst layer 21, and the air electrode diffusion layer 22, which are described above, may be referred to as a membrane electrode assembly (MEA) in the present specification.

[Operation of the Fuel Cell (FIGS. 1 and 3)]

The aqueous solution of formic acid (fuel) is fed from the inside of the fuel tank 50 to the fuel supply pipe 51 by the fuel supply pump 52, and flows from the fuel inflow port 7A of the fuel electrode current collector 13 into the fuel flow groove 13B. As the fuel flows through the fuel flow groove 13B, the fuel penetrates the fuel electrode diffusion layer 12 and reaches surfaces of the electrode catalyst particles of the fuel electrode catalyst layer 11. The oxidation reaction of formic acid represented by the above Formula (3) proceeds on the surfaces of the electrode catalyst particles of the fuel electrode catalyst layer 11.

Carbon dioxide ($CO_2$) and protons ($H^+$) are generated by the oxidation reaction of formic acid represented by Formula (3). The carbon dioxide ($CO_2$) gathers and becomes bubbles, is caused to flow in the fuel flowing through the fuel flow groove 13B (fuel flow path), and is discharged from the fuel electrode 10. The protons ($H^+$) pass through the electrolyte membrane 30 and reach the electrode catalyst particles of the air electrode catalyst layer 21. The electrons $e^-$ generated from formic acid flow through the fuel electrode diffusion layer 12, the fuel electrode catalyst layer 11, and the fuel electrode current collector 13, and further flow from the fuel electrode current collector 13 to an external circuit (electric load).

In the fuel cell system 1, the bubbling device 60 blows the inert gas into the fuel stored in the fuel tank 50, so that the concentration of carbon dioxide in the fuel stored in the fuel tank 50 can be reduced. Accordingly, the fuel supply pipe 51 (fuel supply device) can supply the fuel in which concentration of carbon dioxide is reduced in the fuel tank to the fuel cell. In the fuel electrode 10 of the fuel cell 7, the fuel is warmed by heat generation by oxidation of formic acid (fuel). In addition, as the temperature of the fuel increases, the solubility of carbon dioxide in the fuel decreases. In the fuel cell system 1, the bubbling device 60 is used to supply the fuel having a reduced concentration of carbon dioxide to the fuel cell 7, so that even when the solubility of carbon dioxide with respect to the fuel is decreased in the fuel electrode 10, it is possible to suppress an occurrence therein that the carbon dioxide dissolved in the fuel is not dissolved at all in the fuel and becomes bubbles.

Accordingly, it is possible to suppress an occurrence that the bubbles of the carbon dioxide gas stagnate in the fuel electrode 10, the diffusion of the fuel in the fuel electrode 10 is hindered and the oxidation reaction of the fuel is made difficult to proceed, thereby enabling to prevent a decrease in the power generation efficiency. Further, it is possible to suppress an occurrence that the bubbles of the carbon dioxide gas stagnate in the fuel flow groove 13B (the fuel flow path) and the flow of the fuel in the fuel flow groove 13B (the fuel flow path) is hindered, causing a decrease in the power generation efficiency. Therefore, the fuel cell system 1 can further reduce the concentration of carbon dioxide in the fuel to further improve the power generation efficiency.

The electrons $e^-$ flow from an external circuit (electric load) to the air electrode current collector 23, and further flow through the air electrode current collector 23, the air electrode diffusion layer 22, and the air electrode catalyst layer 21 to reach the air electrode catalyst layer 21. The electrons $e^-$ from the external circuit (electric load), the protons $H^+$ passing through the electrolyte membrane 30, and oxygen of the outside air passing through the air electrode diffusion layer 22 reach the surfaces of the electrode catalyst particles of the air electrode catalyst layer 21, and the redox reaction represented by the above Formula (3) proceeds. Although water ($H_2O$) is generated on the surfaces of the electrode catalyst particles of the air electrode catalyst layer 21 as indicated by Formula (3), the water ($H_2O$) generated on the surfaces of the electrode catalyst particles of the air electrode catalyst layer 21 flows into the air flow groove 23C from the air electrode catalyst layer 21, is discharged from the discharge hole 23B of the air electrode current collector 23 to the recovery pipe 72, and is stored in the waste-liquid tank 70 via the recovery pipe 72, as illustrated in FIGS. 1 and 3.

[Control of Fuel Cell System 1 of First Embodiment (FIGS. 4 and 5)]

Figure 4:
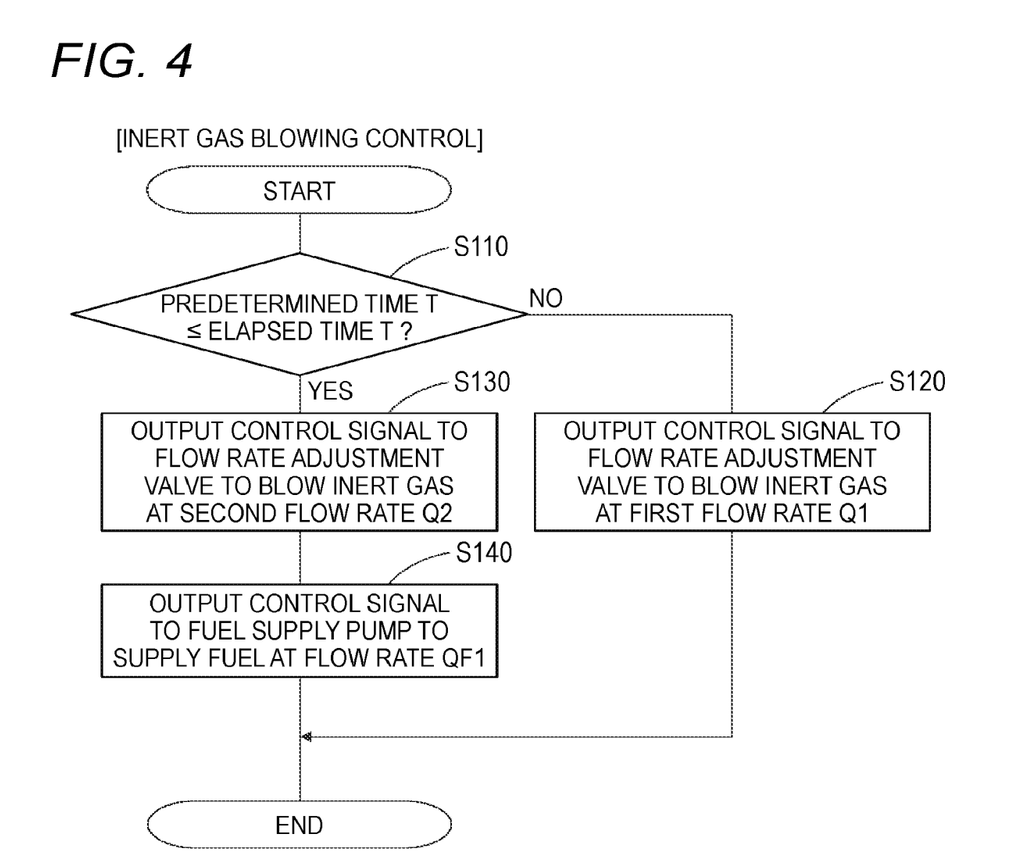
FIG. 4 is a flowchart illustrating an example of a processing procedure performed by a control device according to the embodiment.

Next, an example of an execution processing procedure of inert gas blowing control will be described with reference to a flowchart shown in FIG. 4 and a graph shown in FIG. 5. When the control device 80 is started, the timer 81 is initialized and the measurement of elapsed time T is started. In the flowchart shown in FIG. 4, the control device 80 is started at, for example, a predetermined time interval (for example, an interval of 10 [ms]), and when started, the control device 80 causes the processing to proceed to step S110.

In step S110, the control device 80 determines whether elapsed time T measured by the timer 81 is equal to or longer than predetermined time T1, and causes the processing to proceed to step S130 when the elapsed time T is equal to or longer than the predetermined time T1 (the predetermined time T1≤the elapsed time T) (YES), and causes the processing to proceed to step S120 when the elapsed time T is less than the predetermined time T1 (the elapsed time T<the predetermined time T1) (NO). The predetermined time T1 is time required for sufficiently reducing the concentration of carbon dioxide in the fuel in the fuel tank 50 after start of blowing of the inert gas into the fuel, assuming that the bubbling device 60 continuously blows the inert gas into the aqueous solution of formic acid (fuel) in the fuel tank 50. The predetermined time T1 can be estimated in advance by using experimental data.

When the elapsed time T is equal to or longer than the predetermined time T1 (the predetermined time T1≤the elapsed time T) (YES), it can be determined that the concentration of carbon dioxide in the fuel in the fuel tank 50 is sufficiently reduced. On the other hand, when the elapsed time T is less than the predetermined time T1 (the elapsed time T<the predetermined time T1) (NO), it can be determined that the concentration of carbon dioxide in the fuel in the fuel tank 50 is not sufficiently reduced.

Note that in the fuel cell system 1, the fuel stored in the fuel tank 50 is the fuel in which concentration of carbon dioxide is reduced by heat treatment. Accordingly, the fuel cell system 1 can reduce the amount of inert gas blown into the fuel stored in the fuel tank 50 by the bubbling device 60, which is necessary to reduce the concentration of carbon dioxide dissolved in the fuel.

When the processing proceeds to step S120, the control device 80 outputs a control signal to the flow rate adjustment valve 64 so as to blow the inert gas in the inert gas tank 61 into the fuel in the fuel tank 50 at a first flow rate Q1, and ends the inert gas blowing control. Here, the first flow rate Q1 is larger than a second flow rate Q2 appearing in step S130 to be described later. Note that in a case where it is determined that the concentration of carbon dioxide in the fuel in the fuel tank 50 is not sufficiently reduced when the inert gas blowing control is executed again (step S110: NO), step S120 is executed again, and the inert gas is blown into the fuel in the fuel tank 50 at the first flow rate Q1. Accordingly, before fuel supply is started, the inert gas of the predetermined first flow rate Q1 or more is blown into the fuel stored in the fuel tank 50. When the inert gas is blown into the fuel in this way, the carbon dioxide in the fuel in the fuel tank 50 can be removed and the concentration of carbon dioxide in the fuel in the fuel tank 50 can be reduced, as described above.

The inert gas blown into the fuel in the fuel tank 50 from the bubbling device 60 is discharged from the gas exhaust pipe 53 to the outside of the fuel tank 50. The gas exhaust pipe 53 is provided with the carbon dioxide removing device 54. In the fuel cell system 1, carbon dioxide, which is dissolved in the fuel but released from the fuel together with the inert gas in the fuel tank 50, is removed by the carbon dioxide removing device 54, so that it is possible to prevent carbon dioxide, which is a kind of greenhouse gas, from being discharged to the outside of the fuel cell system 1.

When the processing proceeds to step S130, the control device 80 outputs a control signal to the flow rate adjustment valve 64 so as to blow the inert gas in the inert gas tank 61 into the fuel in the fuel tank 50 at the second flow rate Q2, and causes the processing proceeds to step S140. Here, the second flow rate Q2 is smaller than the first flow rate Q1 described above. Step S130 is executed when it can be determined that the concentration of carbon dioxide in the fuel in the fuel tank 50 is sufficiently reduced (step S110: YES).

With the bubbling device 60, when the inert gas flows into the fuel tank 50 at a small amount, the inert gas flowing into the fuel tank 50 flows in a direction of going from the inside of the bubbling device 60 to the outside. Thus, carbon dioxide in the outside air can be prevented from flowing into the fuel tank 50. As a result, carbon dioxide outside the fuel tank 50 can be prevented from dissolving in the fuel. Therefore, in step S130, even if the flow rate of the inert gas in the inert gas tank 61 blown into the fuel in the fuel tank 50 is set to the second flow rate Q2 that is smaller than the first flow rate Q1, it is considered that the concentration of carbon dioxide in the fuel in the fuel tank 50 can be kept in a low state.

In step S140, the control device 80 outputs a control signal to the fuel supply pump 52 so that the fuel supply pump 52 pumps the fuel at a predetermined flow rate QF1 (for example, about 3 ml/min), and ends the inert gas blowing control. Accordingly, since the fuel is supplied from the fuel tank 50 to the fuel cell 7 at the flow rate QF1 (for example, about 3 ml/min), the fuel cell 7 can start power generation and supply electric power to the electric load (for example, the electric motor).

Figure 5:
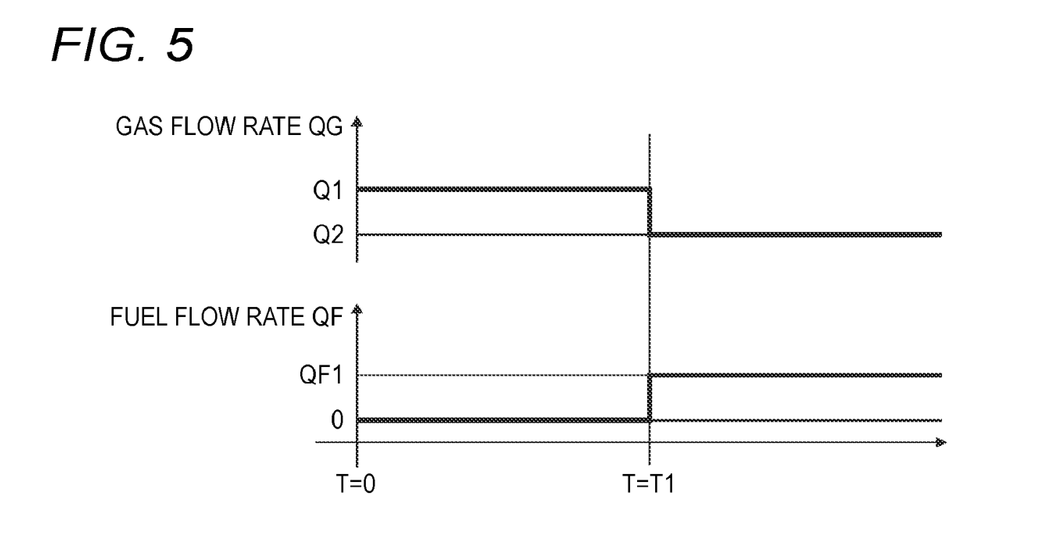
FIG. 5 is a graph illustrating an example of a processing procedure performed by the control device according to the embodiment.

As described above, in the inert gas blowing control, as illustrated in FIG. 5, a gas flow rate QG of the inert gas that the bubbling device 60 blows into the fuel of the fuel tank 50 and a fuel flow rate QF of the fuel that the fuel supply pump 52 feeds to the fuel cell 7 are switched when the elapsed time T=T1. That is, from start (elapsed time T=0) of the control device 80 until lapse of the predetermined time T1 ($0 \leq$ elapsed time $T \leq T1$, step S110: NO), the control device 80 sets the gas flow rate QG of the inert gas blown into the fuel to the first flow rate Q1 (flow rate QG=Q1), and sets the fuel flow rate QF of the fuel to be fed to the fuel cell 7 to 0 (flow rate QF=0) (that is, does not feed fuel to the fuel cell 7).

On the other hand, when the elapsed time T exceeds T1 ($T1 \leq$ elapsed time T, step S110: YES), the control device 80 sets the flow rate QG of the inert gas blown into the fuel to the second flow rate Q2 (flow rate QG=Q2), and sets the fuel flow rate QF of the fuel to be fed to the fuel cell 7 to QF1 (flow rate QF=QF1) (that is, feeds the fuel to the fuel cell 7).

As described above, in the fuel cell system 1, with respect to the flow rate QG of the inert gas blown into the fuel stored in the fuel tank 50, the second flow rate Q2 after the start of supply of the fuel to the fuel cell 7 ($T1 \leq$ elapsed time T, step S110: YES) is smaller than the first flow rate Q1 before the start of supply of the fuel to the fuel cell 7 ($0 \leq$ elapsed time $T \leq T1$, step S110: NO). Accordingly, a use amount of the inert gas blown into the fuel can be reduced after supply of the fuel to the fuel cell 7 is started, that is, the fuel cell 7 starts power generation, and the concentration of carbon dioxide in the fuel can be further reduced.

Other Embodiments

The fuel cell system 1 of the first embodiment of the present disclosure is not limited to the above-described configuration, structure, shape, appearance, and the like, and various modifications, additions, and deletions can be made without changing the spirit of the present disclosure. For example, as illustrated in FIG. 1, in the fuel cell system 1 of the first embodiment, the carbon dioxide removing device 54 is provided, and alternatively, the carbon dioxide removing device 54 may not be provided.

Further, the shapes of the fuel flow groove 13B and the air flow groove 23C may be, for example, a serpentine flow path or a parallel flow path.

Further, the fuel in the fuel tank 50 may be a fuel not subjected to heat treatment.

Further, a tank may be connected to the other end side of the gas exhaust pipe 53, and the gas discharged from the inside of the fuel tank 50 to the gas exhaust pipe 53 may be stored in the tank.

In the fuel cell system 1, an on-off valve controlled by the control device 80 may be provided in the gas exhaust pipe 53. When a fuel subjected to heat treatment is injected from the outside into the fuel tank 50 and stored therein, the inert gas is blown into the fuel tank 50 from the bubbling device 60, and the inside of the fuel tank 50 is filled with the fuel and the inert gas, and then the on-off valve can be closed. Accordingly, the fuel having a reduced concentration of carbon dioxide by being subjected to heat treatment is kept in an inert gas environment in the fuel tank 50, and it is easy to prevent carbon dioxide existing outside the fuel tank 50 from dissolving in the fuel before inert gas supply processing is started.

The present application is based on Japanese Patent Application No. 2019-198715 filed on Oct. 31, 2019, the contents of which are incorporated herein as reference.

The invention claimed is:

1. A fuel cell system having a direct liquid fuel cell configured to use a liquid containing a formic acid or an alcohol as a fuel, the fuel cell system comprising:
   a fuel tank configured to store the fuel to be supplied to the fuel cell;
   a fuel supply device configured to supply the fuel in the fuel tank to the fuel cell; and
   a bubbling device configured to blow an inert gas into the fuel stored in the fuel tank, wherein
   the bubbling device includes a flow rate adjustment valve configured to adjust a flow rate of the inert gas blown into the fuel stored in the fuel tank,
   the fuel cell system further comprises a control device configured to perform a control of the fuel supply device and a control of the flow rate adjustment valve, and
   the control device is configured to:
      perform a control of blowing the inert gas at a first flow rate into the fuel stored in the fuel tank with the flow rate adjustment valve before starting supplying the fuel to the fuel cell with the fuel supply device; and
      perform a control of blowing the inert gas at a second flow rate smaller than the first flow rate into the fuel stored in the fuel tank with the flow rate adjustment valve after starting supplying the fuel to the fuel cell with the fuel supply device.

2. The fuel cell system according to claim 1, further comprising:
a carbon dioxide removing device configured to remove a carbon dioxide among the inert gas and the carbon dioxide, the carbon dioxide being dissolved in the fuel and released from the fuel in the fuel tank.

3. The fuel cell system according to claim 1, wherein the fuel stored in the fuel tank includes the fuel in which a concentration of the carbon dioxide is reduced by a heat treatment.

\* \* \* \* \*